United States Patent [19]

Maycock

[11] 4,339,023

[45] Jul. 13, 1982

[54] TWIN PLATE FRICTION CLUTCHES

[75] Inventor: Ian C. Maycock, Leamington Spa, England

[73] Assignee: Automotive Products Limited, Leamington Spa, England

[21] Appl. No.: 153,917

[22] Filed: May 28, 1980

[30] Foreign Application Priority Data

Jun. 1, 1979 [GB] United Kingdom ............. 7919237

[51] Int. Cl.³ .................................... F16D 13/75
[52] U.S. Cl. ........................... 192/70.25; 192/70.28; 192/111 A
[58] Field of Search ............ 192/70.25, 70.28, 111 A; 188/71.8, 79.5 GE

[56] References Cited

U.S. PATENT DOCUMENTS

| 2,057,802 | 10/1936 | Tatter | 192/111 A |
| 3,086,634 | 4/1963 | Reed | 192/111 A |
| 4,068,750 | 1/1978 | Gatewood | 192/111 A |

FOREIGN PATENT DOCUMENTS

| 2105043 | 10/1977 | Fed. Rep. of Germany | 188/71.8 |
| 2920932 | 11/1979 | Fed. Rep. of Germany | 192/70.25 |
| 2382616 | 9/1978 | France | |
| 694105 | 7/1953 | United Kingdom | |
| 694106 | 7/1953 | United Kingdom | |
| 753722 | 8/1956 | United Kingdom | |
| 804826 | 11/1958 | United Kingdom | |
| 885265 | 12/1961 | United Kingdom | |
| 1018967 | 2/1966 | United Kingdom | |
| 1148742 | 4/1969 | United Kingdom | |
| 1298114 | 11/1972 | United Kingdom | |
| 1456149 | 11/1976 | United Kingdom | |

Primary Examiner—Rodney H. Bonck
Attorney, Agent, or Firm—Kemon & Estabrook

[57] ABSTRACT

A twin plate friction clutch includes a one-way clutch device which allows only relative movement of the intermediate pressure plate towards the flywheel to compensate for wear of the primary driven plate. The clutch device comprises an abutment member supported in a relatively tapered aperture of the pressure plate by ball bearings. Coil springs ensure positive separation of the pressure plate on clutch disengagement until the abutment member contacts the clutch cover.

Several such devices are provided at equi-spaced intervals around the periphery of the intermediate pressure plate.

5 Claims, 3 Drawing Figures

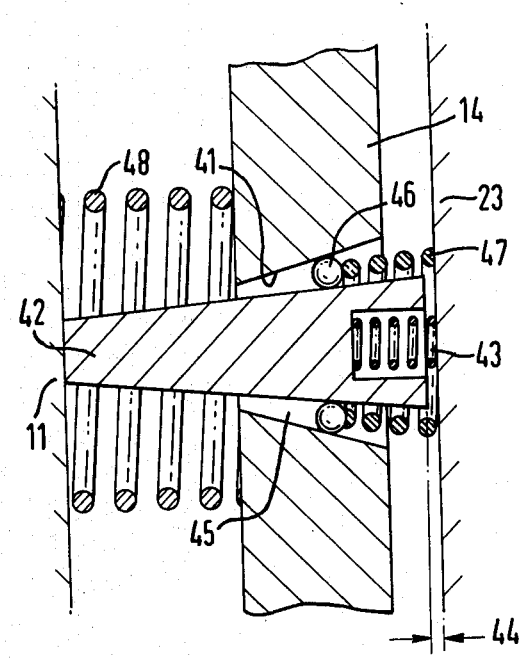
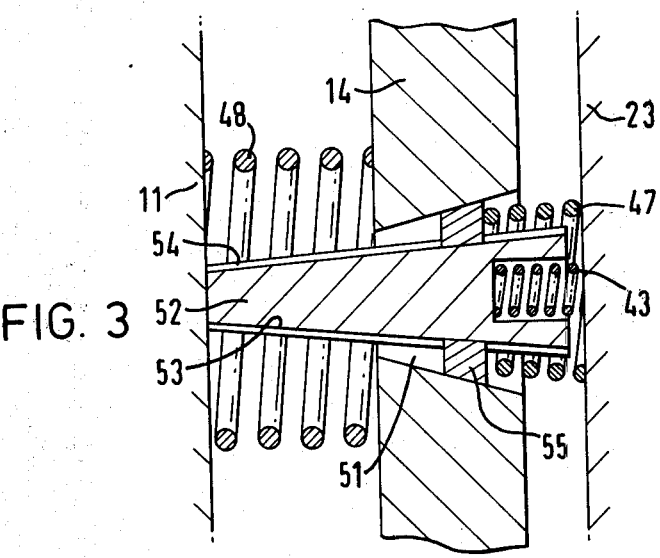

4,339,023

TWIN PLATE FRICTION CLUTCHES

This invention relates to twin plate friction clutches. In this specification twin plate friction clutches are defined as having a driving member and a main pressure plate, an intermediate pressure plate interposed between the driving member and the main pressure plate, each pressure plate being mounted for rotation with the driving member in a manner which allows axial movement with respect thereto; a primary driven plate interposed between a driving surface on the driving member and a driving surface on the intermediate pressure plate, a secondary driven plate interposed between a second driving surface on the intermediate pressure plate and a driving surface on the main pressure plate and clamping means loading the main pressure plate for frictional driving engagement of the driven plates with their respective driving surfaces.

In twin plate clutches of the above mentioned kind, it is usual to provide abutment means to ensure positive separation of the intermediate pressure plate and driving member on clutch release. It is advantageous to automatically adjust such abutment means to compensate for wear of the clutch driven plate friction facings.

One type of adjuster hitherto used includes a slotted spring type straight pin, of the type described in SAE standard J496, the spring pin being inserted in a cooperating bore of the intermediate pressure plate and protruding towards the main pressure plate to limit the maximum axial separation therebetween and hence ensure positive pseparation of the intermediate pressure plate and the driving member. As the secondary driven plate friction facings wear the spring pin is urged a corresponding distance into the intermediate pressure plate by the clamping means acting through the main pressure plate. Such an adjuster is described in our British Pat. No. 1,456,149.

A disadvantage with this type of adjuster is the high load necessary to shift the spring pin relative to the intermediate pressure plate, and in a typical clutch assembly, where four such adjusters are used, this results in a significant reduction in the effective clamping load of the driven plates.

Other types of known adjusters are complicated and take up valuable space within the clutch assembly.

It is an object of the present invention to provide a compact adjuster without the foregoing disadvantages and of economical construction.

According to the invention there is provided a twin plate friction clutch of the kind defined and having a friction grip adjuster arranged to automatically control the axial position of the intermediate pressure plate within the clutch assembly in response to wear of the friction facings of one driven plate, said adjuster comprising a one-way linear clutch device including lost motion means characterised thereby that an aperture is provided in the intermediate pressure plate through which a spacing member passes to define a tapered clearance, wedging means being arranged in the clearance to lock the spring member and intermediate pressure plate together to resist relative separation in one direction of axial load on the intermediate pressure plate.

Preferably the wedging means is resiliently urged into the tapered clearance.

In one embodiment the tapered clearance is of annular cross-section and the wedging means comprises a ball race.

In a second embodiment the tapered clearance is constituted by opposed flat surfaces and the wedging means comprises a wedge having opposed faces for planar contact with said opposed flat surfaces.

Other features of the invention are included in the following description of two preferred embodiments, shown, by way of example in the accompanying drawings in which:

FIG. 2 is a part sectional view through the adjuster shown in FIG. 1; and

FIG. 3 is a part sectional view through an adjuster according to a second embodiment of the invention.

Figure 1:
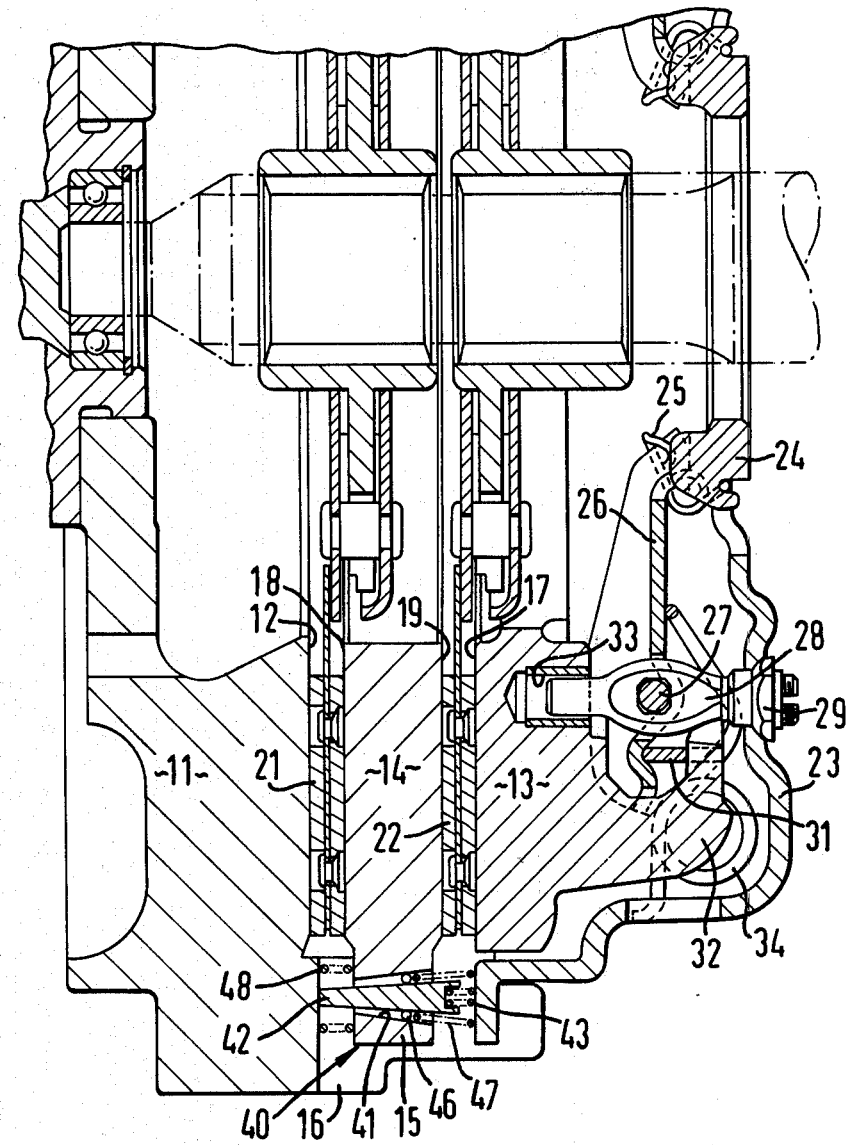
FIG. 1 is a part diametral section through a twin plate friction clutch including an adjuster according to one embodiment of the invention. The clutch is symmetrical and only the section below the axis is shown in full.

A flywheel 11 is attached to the crankshaft of an engine and includes a driving surface 12. A main pressure plate 13 is supported for rotation with the flywheel 11 by conventional means, such as drive straps, (not shown) which allow axial movement of the pressure plate 13 relative to the flywheel 11. An intermediate pressure plate 14, interposed between the main pressure plate 13 and the flywheel 11, is supported for rotation by four circumferentially spaced lugs 15 which are engaged in slots machined in a dished rim 16 of the flywheel 11.

The main pressure plate 13 has a driving surface 17 facing the flywheel 11. The intermediate pressure plate 14 has a first driving surface 18 facing the flywheel 11 and a second driving surface 19 facing the main pressure plate 13. A primary driven plate 21 is interposed between the driving surface 12 on the flywheel 11 and the driving surface 18 on the intermediate pressure plate 14. A secondary driven plate 22 is interposed between the second driving surface 19 of the intermediate pressure plate 14 and the driving surface 17 of the main pressure plate 13.

Coil springs (not shown) act between a cover pressing 23 bolted to the dished rim 16 of the flywheel 11 and the main pressure plate 13 to frictionally engage the driven plates 21, 22 with their respective driving surfaces 12 and 18, 19 and 17.

A conventional clutch release mechanism comprises a thrust plate 24 attached by springs 25 to the ends of four circumferentially spaced radially disposed levers 26. Each lever 26 is fulcrumed on a pin 27 carried by an eyebolt 28 supported on the cover 23 by a nut 29. Struts 31 are provided to act between each lever 26 and lugs 32 formed as part of the main pressure plate 13. When the thrust plate 24 is moved to the left by the usual clutch release bearing (not shown) the levers 26 pivot anti-clockwise on the pins 27 to move the main pressure plate to the right, away from the flywheel 11. Bushed holes 33 locate the eyebolts 28, and springs 34 prevent rattling of the levers 26.

With additional reference to FIG. 2, each lug 15 of the intermediate pressure plate 14 has a conical bore 41 whose axis is parallel to the main axis of the clutch and whose diameter tapers from the cover side to the flywheel side. A generally frustum shaped plunger 42 passes through the bore 41 and is urged against the flywheel 11 by a pre-loaded compression spring 43 pocketed in the plunger 42 and reacting against the cover 23. A predetermined clearance 44 exists between the plunger 42 and the cover 23 when the clutch is assembled.

The relative tapers of the bore 41 and plunger 42 define an annular wedge clearance 45 tapering from the cover side to the flywheel side. A race 46 of ball bearings, restrained by a cage (not shown) are housed in the clearance 45 and act between the wall of the bore 41 and the plunger 42. The race 46 is urged into the clearance 45 against the wall of the bore 41 by a pre-load compression spring 47. A pre-loaded release spring 48, of greater load than the combined load of springs 43 and 47, acts between the flywheel 11 and the intermediate pressure plate 14.

During assembly of the clutch, with the friction facings of the driven plates 21, 22 at maximum thickness, the parts of the adjuster take up the relative positions shown in FIG. 1. As the cover 23 is bolted to the flywheel 11 the clutch springs (not shown) act on the main pressure plate 13 to sandwich the primary driven plate 21, intermediate pressure plate 14 and secondary driven plate 22. Once the load of the release spring 48 is overcome the intermediate pressure plate 14 will move towards the flywheel 11 and the plunger 42 will abut the flywheel under the action of pocketed spring 43.

Further movement of the intermediate pressure plate 14 to fully clamp the primary driven plate 21 will be relative to the plunger 42, the race 46 freely following the intermediate pressure plate 14, under the action of spring 47, to its fully clamped position.

On operation of the levers 26 to release the clutch the main pressure plate 13 is moved away from the flywheel 11. The release spring 48 moves the intermediate pressure plate 14 through the predetermined clearance 44 until the plunger 42 abuts the cover 23, further movement of the intermediate pressure plate 14 being prevented by the locking action of the race 46 in the clearance 45. Thus a predetermined release clearance for the primary driven plate 21 is ensured, further travel of the levers 26 withdrawing the main pressure plate 13 to release the secondary driven plate 22.

As the friction facings of the primary driven plate 21 wear the intermediate pressure plate 14 will tend to take up a clutch engaged position which is nearer to the flywheel 11. Under the action of the main clutch clamping springs the intermediate pressure plate 14 will move relative to the plunger 42 in a manner similar to that of an initial clutch assembly to ensure the predetermined release clearance 44.

The second embodiment, shown in FIG. 3, is similar in operation to the first embodiment and common parts are given the same reference numerals.

An aperture is formed in the intermediate pressure plate 14 whose main axis is parallel to the main axis of the clutch and which has opposed flat mutually tapering surfaces 51, as shown. A plunger 52 of generally rectangular cross-section has opposed flat mutually tapering surfaces 53, the angular relationship of surfaces 51 and 53 corresponding to the taper of bore 41 and plunger 42 of the first embodiment. A keyway 54 cut in each of the surfaces 53 slidably locates a respective wedge member 55 having tapering flat surfaces to correspond with surfaces 51 and 53. The wedge members 55 are acted on by spring 47 and spring 43 is pocketed, as in the first embodiment, in the plunger 52.

The operation of this embodiment is exactly the same as that previously described, the wedge members 55 acting to lock relative axial movement of the intermediate pressure plate 14 and plunger 52 in one direction and permit free movement in the opposite direction.

Other types of locking members such as rollers may replace the race 46 and wedge member 55 herein described and all embodiments of the invention are adaptable to diaphragm spring type clutches.

I claim:

1. A twin plate friction clutch assembly comprising a flywheel, a first driven plate, an intermediate pressure plate, a second driven plate, a main pressure plate, a cover member and releasable clutch clamping means and having friction grip adjuster means arranged to automatically control the axial position of the intermediate pressure plate within the assembly in response to wear of the friction facings of one driven plate, the intermediate pressure plate having a peripheral aperture therethrough and said adjuster means constituting a one-way clutch device incorporating lost motion means and comprising:
   a spacing member passing through said aperture to define therewith a tapered space;
   first spring means to urge the spring member against an abutment of the flywheel;
   second spring means to urge the intermediate pressure plate away from said flywheel;
   an abutment for said spacing member on the cover member;
   and wedging means located in said space to lock the spring member and intermediate pressure plate together to resist relative separation in one direction of axial load on said intermediate pressure plate, said wedging means being operable on abutment of the spring member with said cover member.

2. The friction clutch of claim 1, wherein said wedging means is urged into the tapered space by resilient means acting against said cover member.

3. The friction clutch of claim 2, wherein said resilient means and said first spring means are both coil springs arranged concentrically about one another.

4. The friction clutch of claim 3, wherein said tapered space is constituted by opposed flat surfaces, said wedging means comprising a wedge having opposed faces for planar contact with said opposed flat surfaces.

5. The friction clutch of claim 4, wherein said spacing member includes a keyway in which said wedge is seated and guided for axial movement.

* * * * *